United States Patent
Mullins et al.

(10) Patent No.: US 9,625,724 B2
(45) Date of Patent: Apr. 18, 2017

(54) RETRACTABLE DISPLAY FOR HEAD MOUNTED DEVICE

(71) Applicant: DAQRI, LLC, Los Angeles, CA (US)

(72) Inventors: Brian Mullins, Sierra Madre, CA (US); Matthew Kammerait, West Hollywood, CA (US); Christopher Broaddus, Mountain View, CA (US); Timotheos Leahy, Los Angeles, CA (US); Christopher Michaels Garcia, Whittier, CA (US)

(73) Assignee: DAQRI, LLC, Los Angeles, CA (US)

( * ) Notice: Subject to any disclaimer, the term of this patent is extended or adjusted under 35 U.S.C. 154(b) by 61 days.

(21) Appl. No.: 14/477,687

(22) Filed: Sep. 4, 2014

(65) Prior Publication Data

US 2016/0070109 A1 Mar. 10, 2016

(51) Int. Cl.
*G02B 27/14* (2006.01)
*G02B 27/01* (2006.01)

(52) U.S. Cl.
CPC .. *G02B 27/0176* (2013.01); *G02B 2027/0159* (2013.01); *G02B 2027/0181* (2013.01)

(58) Field of Classification Search
CPC .................................................. G02B 27/017
USPC ......................................................... 359/630
See application file for complete search history.

(56) References Cited

U.S. PATENT DOCUMENTS

| | | | | |
|---|---|---|---|---|
| 3,833,300 A * | 9/1974 | Rymes | ............... | G02B 27/0093 2/10 |
| 5,473,778 A | 12/1995 | Bell | | |
| 5,844,530 A * | 12/1998 | Tosaki | ................. | G02B 27/017 345/7 |
| 8,358,254 B2 * | 1/2013 | Baudou | ................ | A42B 3/0433 345/8 |
| 8,384,999 B1 * | 2/2013 | Crosby | .............. | G02B 27/0172 349/11 |
| 2013/0305437 A1 | 11/2013 | Weller et al. | | |
| 2013/0314303 A1 | 11/2013 | Osterhout et al. | | |
| 2014/0111864 A1 * | 4/2014 | Margulis | ............ | G02B 27/0172 359/630 |
| 2014/0167986 A1 | 6/2014 | Parada et al. | | |

FOREIGN PATENT DOCUMENTS

| | | |
|---|---|---|
| CN | 2314765 Y | 4/1999 |
| WO | WO-2016036645 A1 | 3/2016 |

OTHER PUBLICATIONS

"International Application Serial No. PCT/US2015/047683, International Search Report mailed Nov. 24, 2015", 2 pgs.
"International Application Serial No. PCT/US2015/047683, Written Opinion mailed Nov. 24, 2015", 6 pgs.
"International Application Serial No. PCT/US2015/047683, International Preliminary Report on Patentability mailed Sep. 8, 2016", 8 pgs.

* cited by examiner

*Primary Examiner* — James Jones
(74) *Attorney, Agent, or Firm* — Schwegman Lundberg & Woessner, P.A.

(57) ABSTRACT

A head mounted device includes a helmet with a guide, a lens frame, at least one display surface mounted to the lens frame. The guide extends from a cavity of the helmet. The lens frame is moveably connected to the guide and moves along an axis of the guide between a first position within the cavity of the helmet and a second position outside the cavity of the helmet. The display surface is transparent and configured to display augmented reality content.

14 Claims, 19 Drawing Sheets

RETRACTABLE DISPLAY FOR HEAD MOUNTED DEVICE

TECHNICAL FIELD

The subject matter disclosed herein generally relates to head mounted device. Specifically, the present disclosure addresses systems and methods for a retractable display surface in the head mounted device for viewing augmented reality content.

BACKGROUND

An augmented reality (AR) device can be used to generate and display data in addition to an image captured with the AR device. For example, AR is a live, direct, or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

However, a user may not need to use the AR device at all times. For example, the user may not wish to use the AR device when AR content is not available, or when the user does not wish to be distracted by the AR content. As such, the user would have to manually deactivate and put away the AR device.

BRIEF DESCRIPTION OF THE DRAWINGS

Some embodiments are illustrated by way of example and not limitation in the figures of the accompanying drawings.

DETAILED DESCRIPTION

Figure 1:
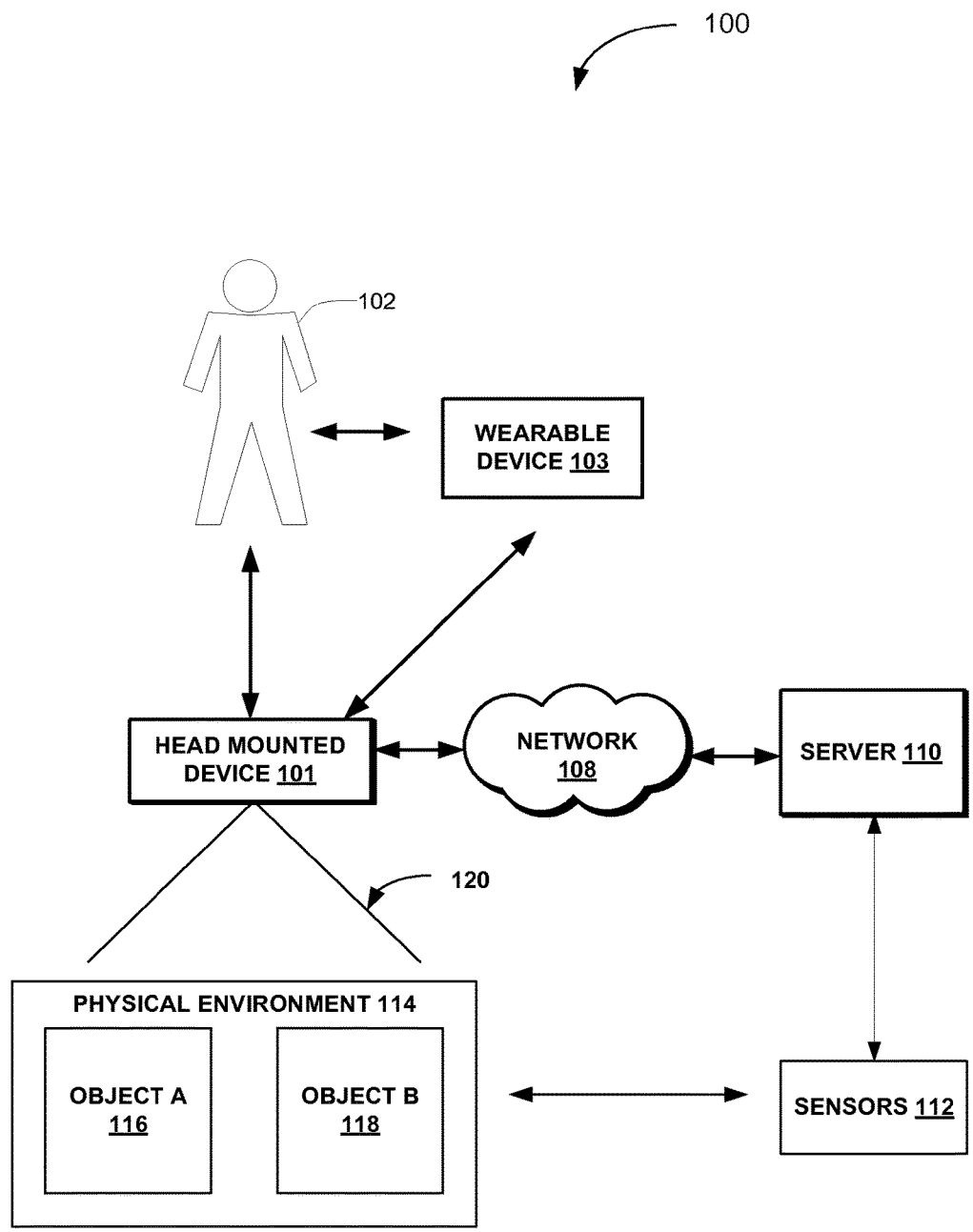
FIG. 1 is a block diagram illustrating an example of a network suitable for a head mounted device system, according to some example embodiments.

Example methods and systems are directed to a retractable display surface of a head mounted device (HMD). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, the HMD includes a helmet with a display surface that can be retracted inside the helmet and extended outside the helmet to allow a user to view the display surface. The position of the display surface may be adjusted based on an eye level of the user. The display surface includes a display lens capable of displaying augmented reality (AR) content. The helmet may include a computing device such as a hardware processor with an AR application that allows the user wearing the helmet to experience information, such as in the form of a virtual object such as a three-dimensional (3D) virtual object overlaid on an image or a view of a physical object (e.g., a gauge) captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the helmet. The display lens may be transparent to allow the user see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object, a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet, or other inputs from other devices, such as a wearable device. For example, the display lenses may extract or retract based on a voice command of the user, a gesture of the user, a position of a watch in communication with the helmet.

A system and method for retractable display of a HMD are described. In one example embodiment, a HMD includes an enclosure, a guide, a lens frame, and a display lens mounted to the lens frame. The guide extends from the enclosure. The lens frame is coupled to the guide and configured to move along an axis of the guide between a first position within a cavity of the enclosure and a second position outside the cavity of the enclosure. The display lens is transparent and configured to display augmented reality content.

In one example embodiment, the HMD includes a motor and a belt. The motor is disposed within the enclosure. The belt connects the motor to the lens frame. The motor is configured to wind a portion of the belt to move the lens frame to the first position of the lens frame, and to unwind the portion of the belt to move the lens frame to the second position of the lens frame. The belt guide is disposed adjacent to the motor in the cavity of the enclosure. The belt guide routes the belt from the motor to the lens frame. A portion of the belt between the belt guide and the lens frame is parallel to the axis of the guide.

In one example embodiment, the HMD includes an actuator disposed within the enclosure. The actuator is configured to extend and contract along the axis of the guide between the first position of the lens frame and the second position of the lens frame.

In one example embodiment, the HMD includes a sensor and a controller. The sensor detects a first condition and a second condition. The controller initiates an extension of the lens frame from the first position to the second position in response to the first condition, and a retraction of the lens frame from the second position to the first position in response to the second condition. The sensor includes an audio or optical sensor.

In one example embodiment, the HMD includes an AR module configured to cause the at least one display lens to display AR content in response to the first condition, and to cause the at least one display lens to hide the AR content in response to the second condition.

In one example embodiment, the HMD includes an AR module configured to cause the at least one display lens to display AR content in response to the lens frame being in the second position, and to cause the at least one display lens to hide a portion of the AR content in response to the lens frame being in the first position.

In one example embodiment, the HMD includes a wireless module configured to wirelessly communicate with a wearable device external to the HMD. The wireless module is configured to receive a first message and a second message from the wearable device. The controller is configured to correlate the first message with the first condition and the second message with the second condition. The first message corresponds to a first state of the wearable device. The second message corresponds to a second state of the wearable device. In another example embodiment, the first state of the wearable device corresponds to a first relative position between the wearable device and the HMD. The second state of the wearable device corresponds to a second relative position between the wearable device and the HMD.

In one example embodiment, the controller powers on the display lens in response to the first condition, and powers off the display lens in response to the second condition. In another example embodiment, the controller powers on the display lens in response to the lens frame being in the first position, and powers off the display lens in response to the lens frame being in the second position.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR application of a HMD with retractable display lenses, according to some example embodiments. The network environment 100 includes a HMD 101 and a server 110, communicatively coupled to each other via a network 108. The HMD 101 and the server 110 may each be implemented in a computer system, in whole or in part, as described below with respect to FIGS. 14 and 15.

The server 110 may be part of a network-based system. For example, the network-based system may be or include a cloud-based server system that provides AR content (e.g., augmented information including 3D models of virtual objects related to physical objects captured by the HMD 101) to the HMD 101.

The HMD 101 may include a helmet that a user 102 may wear to view the AR content related to captured images of several physical objects (e.g., object A 116, object B 118) in a real world physical environment 114. In one example embodiment, the HMD 101 includes a computing device with a camera and a display (e.g., smart glasses, smart helmet, smart visor, smart face shield, smart contact lenses). The computing device may be removably mounted to the head of the user 102. In one example, the display may be a screen that displays what is captured with a camera of the HMD 101. In another example, the display of the HMD 101 may be transparent or semi-transparent surface such as in the visor or face shield of a helmet, or a display lens distinct from the visor or face shield of the helmet.

The user 102 may wear a wearable device 103 (e.g., a watch). The wearable device 103 communicates wirelessly with the HMD 101 to enable the user to control extension and retraction of the display. Components of the wearable device 103 are described in more detail with respect to FIG. 4.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, and letters. The user 102 may point a camera of the HMD 101 to capture an image of the objects 116 and 118 in the physical environment 114.

In one example embodiment, the objects in the image are tracked and recognized locally in the HMD 101 using a local context recognition dataset or any other previously stored dataset of the AR application of the HMD 101. The local context recognition dataset module may include a library of virtual objects associated with real-world physical objects or references. In one example, the HMD 101 identifies feature points in an image of the devices 116, 118 to determine different planes (e.g., edges, corners, surface, dial, letters). The HMD 101 may also identify tracking data related to the devices 116, 118 (e.g., GPS location of the HMD 101, orientation, distances to devices 116, 118). If the captured image is not recognized locally at the HMD 101, the HMD 101 can download additional information (e.g., 3D model or other augmented data) corresponding to the captured image, from a database of the server 110 over the network 108.

In another embodiment, the objects 116, 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects or references.

Sensors 112 may be associated with, coupled to, related to the devices 116 and 118 in the physical environment 114 to measure a location, information, reading of the devices 116 and 118. Examples of measured reading may include and but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the devices 116 and 118 to show data related to the devices 116 and 118. For example, the virtual indicators may include arrows with shapes and colors that change based on real-time data. The visualization may be provided to the HMD 101 so that the HMD 101 can render the virtual indicators in a display of the HMD 101. In another embodiment, the virtual indicators are rendered at the server 110 and streamed to the HMD 101. The HMD 101 displays the virtual indicators or visualization corresponding to a display of the physical environment 114 (e.g., data is visually perceived as displayed adjacent to the devices 116 and 118).

The sensors 112 may include other sensors used to track the location, movement, and orientation of the HMD 101 externally without having to rely on the sensors internal to the HMD 101. The sensors 112 may include optical sensors (e.g., depth-enabled 3D camera), wireless sensors (Bluetooth, Wi-Fi), GPS sensor, and audio sensor to determine the location of the user 102 having the HMD 101, distance of the user 102 to the tracking sensors 112 in the physical environment 114 (e.g., sensors placed in corners of a venue or a room), the orientation of the HMD 101 to track what the user 102 is looking at (e.g., direction at which the HMD 101 is pointed, HMD 101 pointed towards a player on a tennis court, HMD 101 pointed at a person in a room).

In another embodiment, data from the sensors 112 and internal sensors in the HMD 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., such as whether a user 102 tapped on a link in the virtual object), and any suitable combination thereof. The HMD 101 receives a visualization content dataset related to the analytics data. The HMD 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 14 and 15. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMD 101, wearable device 103). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
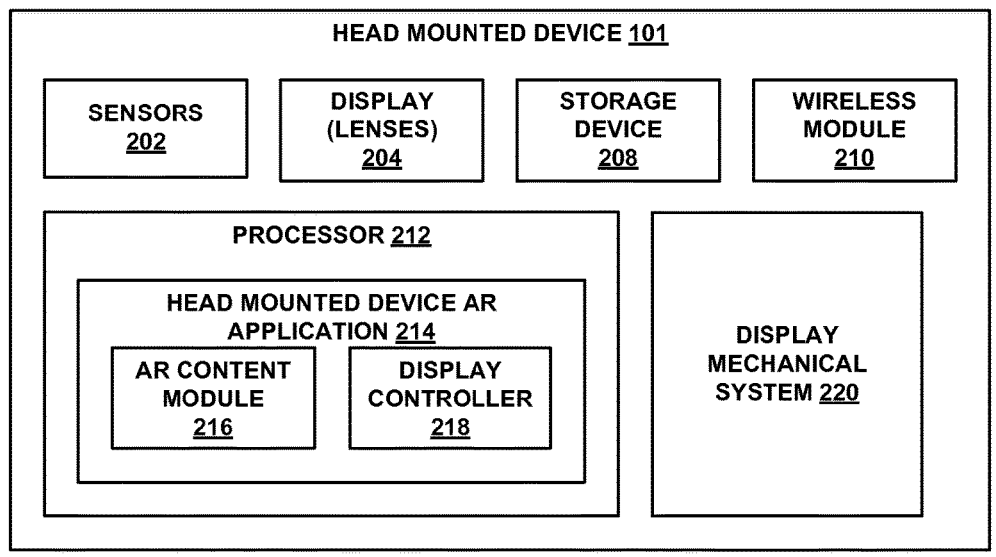
FIG. 2 is a block diagram illustrating an example embodiment of a head mounted device.

FIG. 2 is a block diagram illustrating modules (e.g., components) of the HMD 101, according to some example embodiments. The HMD 101 may be a helmet that includes sensors 202, a display 204, a storage device 208, a wireless module 210, a processor 212, and display mechanical system 220.

The sensors 202 may include, for example, a proximity or location sensor (e.g., Near Field Communication, GPS, Bluetooth, Wi-Fi), an optical sensor(s) (e.g., camera), an orientation sensor(s) (e.g., gyroscope, or an inertial motion sensor), an audio sensor (e.g., a microphone), or any suitable combination thereof. For example, the sensors 202 may include rear facing camera(s) and front facing camera(s) disposed in the HMD 101. It is noted that the sensors 202 described herein are for illustration purposes. Sensors 202 are thus not limited to the ones described. The sensors 202 may be used to generate internal tracking data of the HMD 101 to determine what the HMD 101 is capturing or looking at in the real physical world. For example, a virtual menu may be activated when the sensors 202 indicate that the HMD 101 is oriented downward (e.g., when the user tilts his head to watch his wrist).

The display 204 may include a display surface or lens capable of displaying AR content (e.g., images, video) generated by the processor 212. In another embodiment, the display 204 may also include a touchscreen display configured to receive a user input via a contact on the touchscreen display. In another example, the display 204 may be transparent or semi-transparent so that the user 102 can see through the display lens 204 (e.g., such as in a Head-Up Display).

The storage device 208 may store a database of identifiers of wearable devices capable of communicating with the HMD 101. In another embodiment, the database may also include visual references (e.g., images) and corresponding experiences (e.g., 3D virtual objects, interactive features of the 3D virtual objects). The database may include a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding experiences (e.g., virtual objects that represent the ten most sensing devices in a factory floor). In another example, the server 110 may generate the first set of images based on the most popular or often scanned images received at the server 110. Thus, the primary content dataset does not depend on objects or images scanned by the HMD 101.

The contextual content dataset includes, for example, a second set of images and corresponding experiences (e.g., three-dimensional virtual object models) retrieved from the server 110. For example, images captured with the HMD 101 that are not recognized (e.g., by the server 110) in the primary content dataset are submitted to the server 110 for recognition. If the captured image is recognized by the server 110, a corresponding experience may be downloaded at the HMD 101 and stored in the contextual content dataset. Thus, the contextual content dataset relies on the context in which the HMD 101 has been used. As such, the contextual content dataset depends on objects or images scanned by the recognition module 214 of the HMD 101.

In one embodiment, the HMD 101 may communicate over the network 108 with the server 110 to retrieve a portion of a database of visual references, corresponding 3D virtual objects, and corresponding interactive features of the 3D virtual objects.

The wireless module 210 comprises a component to enable the HMD 101 to communicate wirelessly with other machines such as the server 110 and the wearable device 103. The wireless module 210 may operate using Wi-Fi, Bluetooth, and other wireless communication means.

The processor 212 may include a HMD AR application 214 for generating a display of information related to the objects 116, 118. In one example embodiment, the HMD AR application 214 includes an AR content module 216 and a display controller 218. The AR content module 216 generates a visualization of information related to the objects 116, 118 when the HMD 101 captures an image of the objects 116, 118 and recognizes the objects 116, 118 or when the HMD 101 is in proximity to the objects 116, 118. For example, the HMD AR application 210 may generate a display of a holographic or virtual menu visually perceived as a layer on the objects 116, 118. The display controller 218 is configured to control the display 204. For example, the display controller 218 controls an adjustable position of the display 204 in the HMD 101 and controls a power supplied to the display 204.

Figure 3:
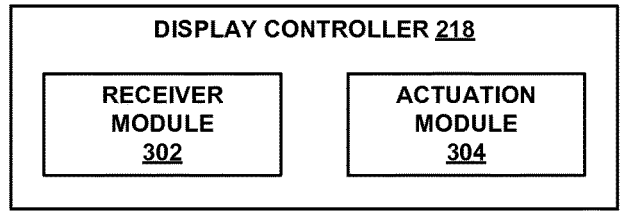
FIG. 3 is a block diagram illustrating an example embodiment of a display controller.

In one example embodiment, the display controller 218 includes a receiver module 302 and an actuation module 304 as illustrated in FIG. 3. The receiver module 302 communicates with sensors 202 in the HMD 101 and the wearable device 103 to identify commands related to the display 204. For example, the receiver module 302 may identify an audio command (e.g., "lower glasses") from the user 102 to lower a position of the display 204. In another example, the receiver module 302 may identify that AR content is associated with objects 116, 118, and lowers to the display 204 in the HMD 101. If no AR content is identified, the display 204 remains hidden in the HMD 101. In another example, the receiver module 302 determines whether AR content exists at the physical environment 114 based on the AR content module 216 and the server 110. In another example, the receiver module 302 identifies a signal from the wearable device 103 (e.g., command from the wearable device to lower the display, position of the wearable device relative to the HMD—lowered or raised) and adjusts the position of the display 204 based on the signal.

The actuation module 304 generates an actuation command to the display mechanical system 220 (e.g., motor, actuator) to raise the display 204 inside the HMD 101 or lower the display 204 outside the HMD 101 based on the determination made from the receiver module 302. Examples of mechanical systems are illustrated in FIGS. 12A, 12B, 12C, 12D, 13A, 13B, 13C, and 13D.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
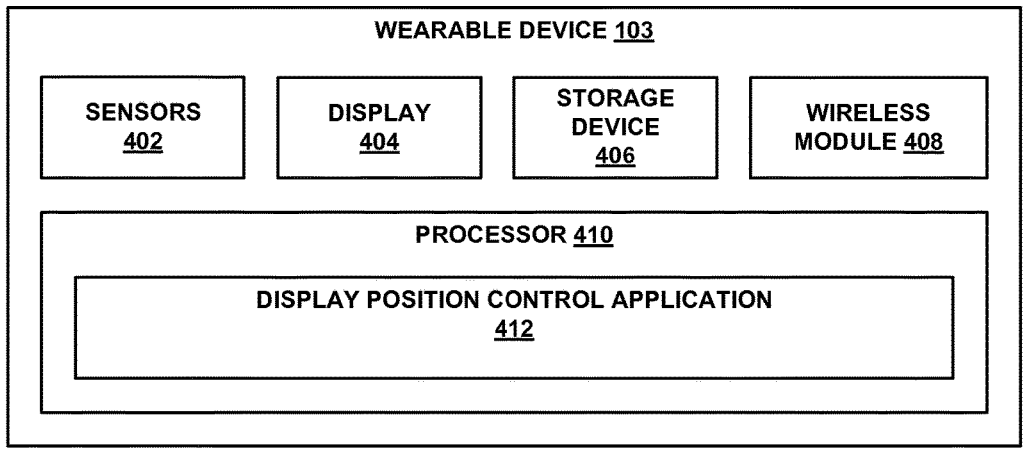
FIG. 4 is a block diagram illustrating an example embodiment of a wearable device.

FIG. 4 is a block diagram illustrating modules (e.g., components) of the wearable device 103, according to some example embodiments. The wearable device 103 may include sensors 402, a display 404, a storage device 406, a wireless module 408, and a processor 410.

The sensors 402 may include, for example, a proximity or location sensor (e.g., Near Field Communication, GPS, Bluetooth, Wi-Fi), an optical sensor(s) (e.g., camera), an orientation sensor(s) (e.g., gyroscope, or an inertial motion sensor), an audio sensor (e.g., a microphone), or any suitable combination thereof.

The display 404 may also include a touchscreen display configured to receive a user input via a contact on the touchscreen display. In one example, the display 404 may include a screen configured to display images generated by the processor 410. The storage device 406 stores information about the HMD 101 for authentication. The wireless module 408 includes a communication device (e.g., Bluetooth device, Wi-Fi device) that enables the wearable device 103 to wirelessly communicate with the HMD 101.

The processor 410 may include a display position control application 412 for adjusting a position of the display 204 of the HMD 101. In one example embodiment, the display position control application 412 identifies operations on the wearable device 103 to the HMD 101. For example, the display position control application 412 may detect that the user 102 has pushed a particular button of the wearable device 103. The display position control application 412 communicates that information to the HMD 101 to identify a position of the display 204 based on the button that was pushed. The wearable device 103 may include one physical button for raising the display 204 of HMD 101 and another physical button for lowering the display 204 of HMD 101.

Figure 5:
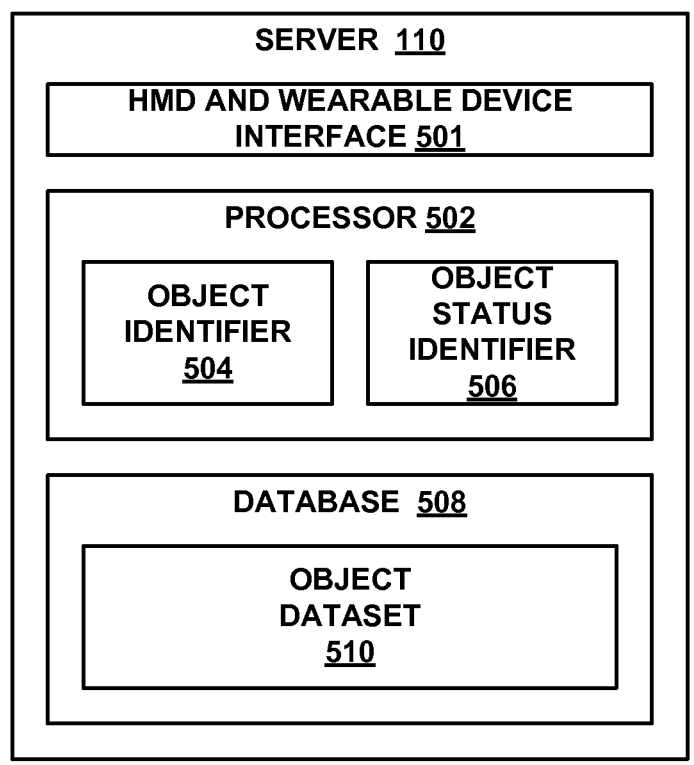
FIG. 5 is a block diagram illustrating an example embodiment of a server.

FIG. 5 is a block diagram illustrating modules (e.g., components) of the server 110. The server 110 includes a HMD and smartwatch interface 501, a processor 502, and a database 508. The HMD and smartwatch interface 501 may communicate with the HMD 101, the wearable device 103, and sensors 112 (FIG. 1) to receive real time data.

The processor 502 may include an object identifier 504 and an object status identifier 506. The object identifier 504 may identify devices 116, 118 based on a picture or image frame received from the HMD 101. In another example, the HMD 101 already has identified devices 116, 118 and has provided the identification information to the object identifier 504. The object status identifier 506 determines the physical characteristics associated with the devices identified. For example, if the device is a gauge, the physical characteristics may include functions associated with the gauge, location of the gauge, reading of the gauge, other devices connected to the gauge, safety thresholds or parameters for the gauge. AR content may be generated based on the object identified and a status of the object.

The database 508 may store an object dataset 510. The object dataset 510 may include a primary content dataset and a contextual content dataset. The primary content dataset comprises a first set of images and corresponding virtual object models. The contextual content dataset may include a second set of images and corresponding virtual object models.

Figure 6:
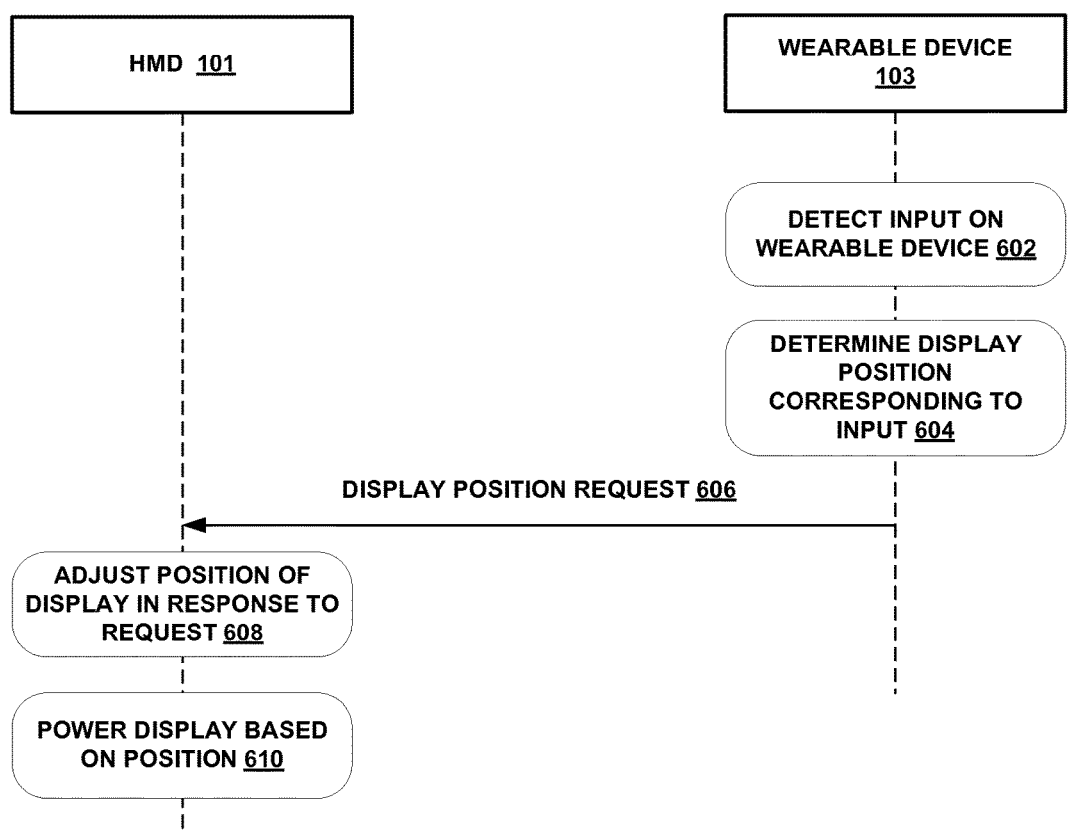
FIG. 6 is an interaction diagram illustrating an example of an interaction between a head mounted device and a wearable device.

FIG. 6 is an interaction diagram illustrating an example embodiment of an operation of the HMD 101 with the wearable device 103. At operation 602, an input is detected on the wearable device 602. For example, the wearable device 602 detects that the user has pushed a specific button, tapped on a screen of the wearable device 602 within a particular user interface, moved or shook the wearable device 602. At operation 604, the wearable device 103 determines and generates a request for a specific position of the display 204 based on the input. At operation 606, the wearable device sends the request to the HMD 101. At operation 608, the HMD 101 identifies the requested position of the display 204 based on the request. At operation 610, the HMD 101 powers (off or on) the display 204 according to the position of the display 204.

Figure 7:
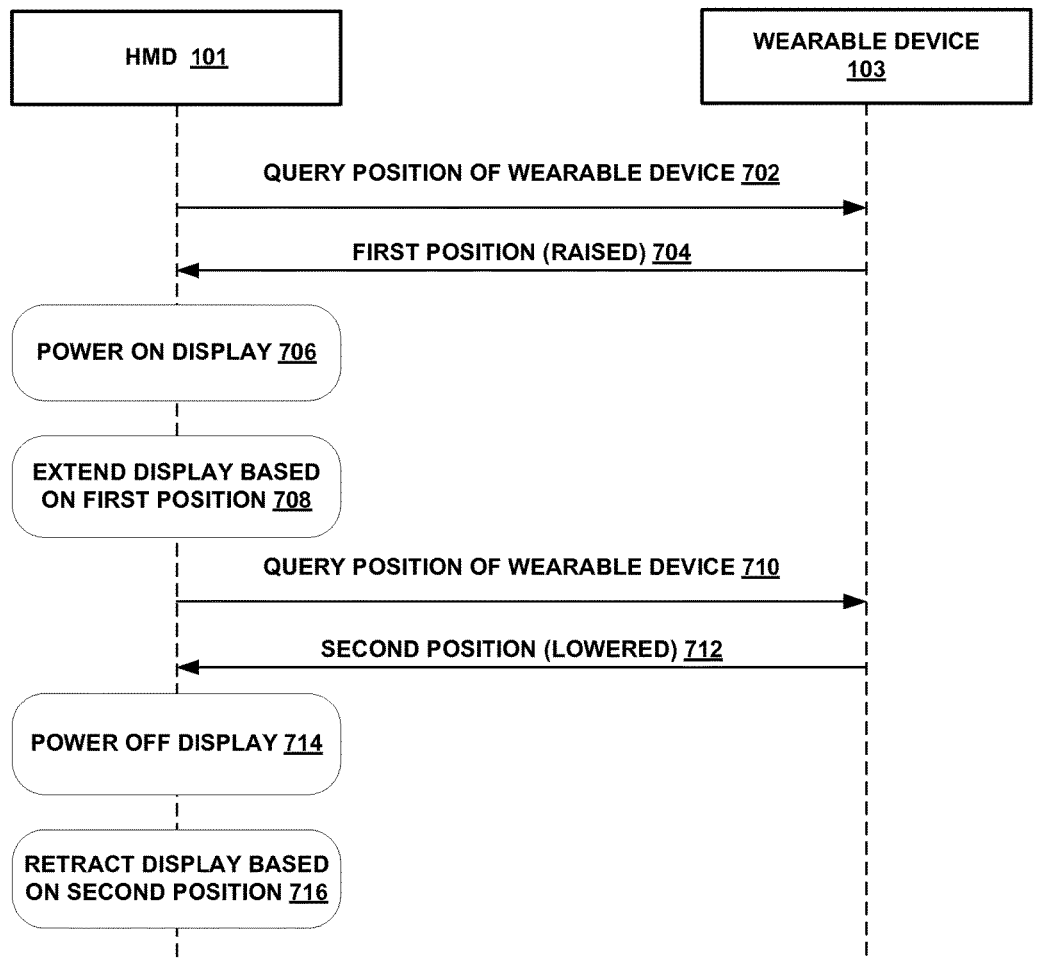
FIG. 7 is an interaction diagram illustrating another example of an interaction between the head mounted device and the wearable device.

FIG. 7 is an interaction diagram illustrating an example embodiment of an operation of the HMD 101 with the wearable device 103. At operation 702, the HMD 101 queries a position of the wearable device 103 relative to the user 102 or the HMD 101. At operation 704, the wearable device 103 communicates the position of the wearable device to the HMD 101. For example, the wearable device 103 may be in a first position (e.g., raised). At operation 706, the HMD 101 powers on the display 204 in response to determining that the display 204 is in the first position. At operation 708, the HMD 101 extends the display 204 from the HMD 101 based on the first position.

At operation 710, the HMD 101 queries for an updated position of the wearable device 103. At operation 712, the wearable device 103 communicates the updated position of the wearable device 103 to the HMD 101. For example, the wearable device 103 may be in a second position (e.g., lowered). At operation 714, the HMD 101 powers off the display 204 in response to determining that the display 204 is in the second position. At operation 716, the HMD 101 retracts the display 204 inside the HMD 101 based on the first position.

Figure 8:
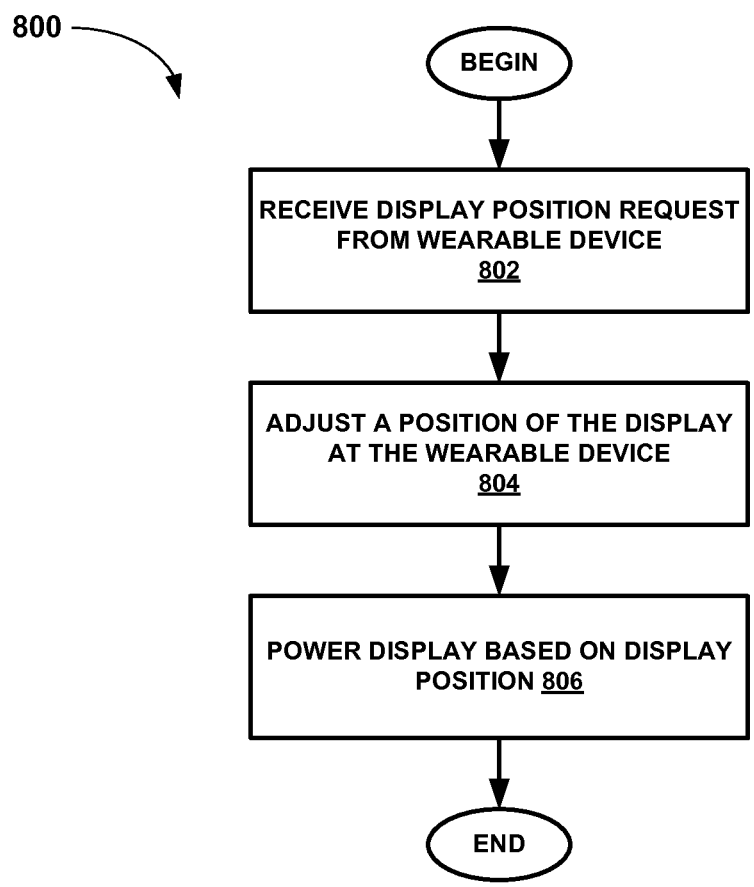
FIG. 8 is a flowchart illustrating a method for operating a retractable display of a head mounted device with a wearable device, according to an example embodiment.

FIG. 8 is a flowchart illustrating an example method 800 for operating the display 204. At operation 802, a display position request is received from the wearable device 103. The display position request may include a request to raise or lower the display 204 inside or outside a cavity of the HMD 101. In one embodiment, operation 802 may be implemented using the receiver module 302 of FIG. 3.

At operation 804, a position of the display 204 is adjusted in response to the request. For example, the display 204 may be lowered outside the HMD 101 or raise inside the HMD 101. In one embodiment, operation 804 may be implemented using the actuation module 304 of FIG. 3.

At operation 806, the display 204 is powered on or off based on the display position. For example, the display 204 may be powered off when the display 204 is retracted inside the HMD 101, and powered on when the display 204 is extended outside the HMD 101. In one embodiment, operation 806 may be implemented using the actuation module 304 of FIG. 3.

Figure 9:
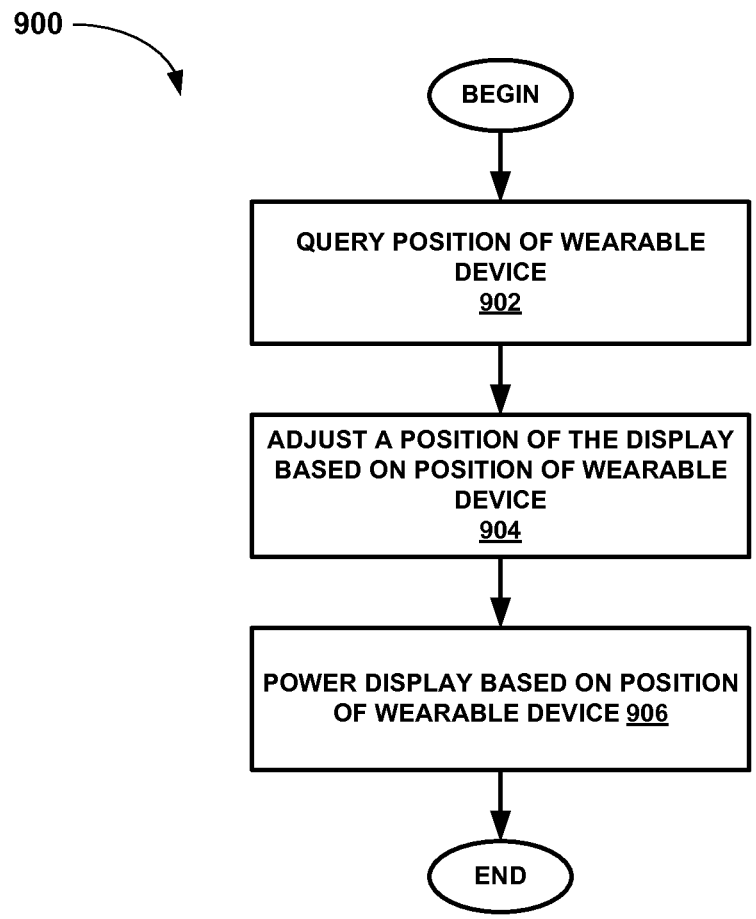
FIG. 9 is a flowchart illustrating another method for operating a retractable display of a head mounted device with a wearable device, according to an example embodiment.

FIG. 9 is a flowchart illustrating another method 900 for operating the display 204. At operation 902, the HMD 101 queries a position of the wearable device 103 relative to the user 102 or the HMD 101. For example, the position identifies that the user 102 has raised his wrist on which the wearable device 103 in mounted. In one embodiment, operation 902 may be implemented using the receiver module 302 of FIG. 3.

At operation 904, the position of the display 204 is adjusted based on the identified position of the display 204. For example, the display 204 may be lowered outside the HMD 101 when the wearable device 103 is raised (e.g., raised wrist of the user 102) and raised inside the HMD 101 when the wearable device 103 is lowered (e.g., lower wrist of the user 102). In one embodiment, operation 904 may be implemented using the actuation module 304 of FIG. 3.

At operation 906, the display 204 is powered on or off based on the position of the wearable device. For example, the display 204 may be powered off when the wearable device 103 is lowered, or powered on when the wearable device 103 is raised. In one embodiment, operation 906 may be implemented using the actuation module 304 of FIG. 3.

Figure 10:
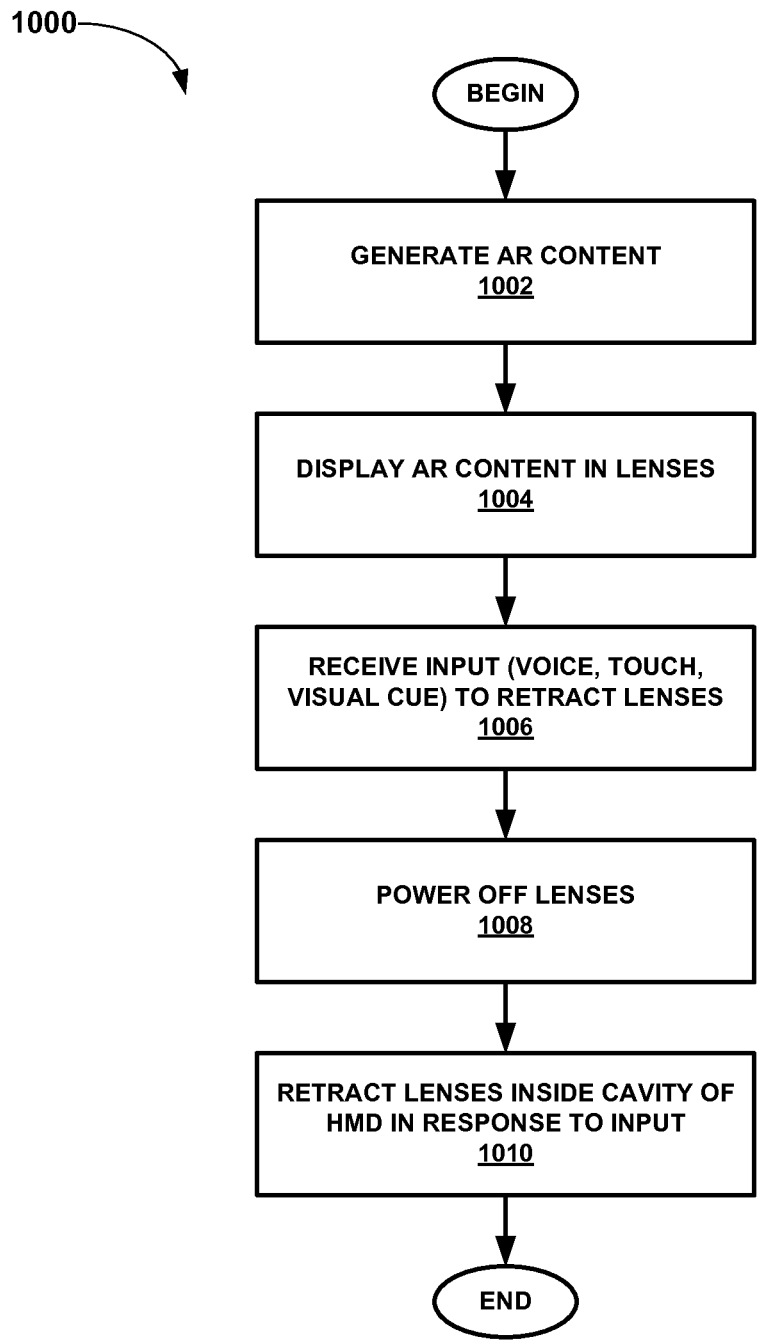
FIG. 10 is a flowchart illustrating another method for operating a retractable display of a head mounted device, according to an example embodiment.

FIG. 10 is a flowchart illustrating another method for operating the display 204, according to an example embodiment. At operation 1002, the HMD 101 generates AR content. At operation 1004, the AR content is displayed in the display 204, for example lenses. In one embodiment, operations 1002, 1004 may be implemented using the AR content module 216 of FIG. 2.

At operation 1006, the HMD 101 receives an input related to a requested to retract the lenses. The input may be communicated via audio input, touch input, visual input). The audio input may be a voice command such as "extend lenses". The touch input may be the user touching a specific part of the helmet. The visual input may be based on the direction or gaze of the user. For example, the user can look at the upper right corner of his field of view for a predetermined amount of time to indicate a request to raise the lenses. In one embodiment, operation 1006 may be implemented using the receiver module 302 of FIG. 3.

At operation 1008, the lenses may be powered off. At operation 1010, the lenses may be retracted inside the HMD 101 in response to the input. In one embodiment, operation 1010 may be implemented using the actuation module 304 of FIG. 3.

Figure 11:
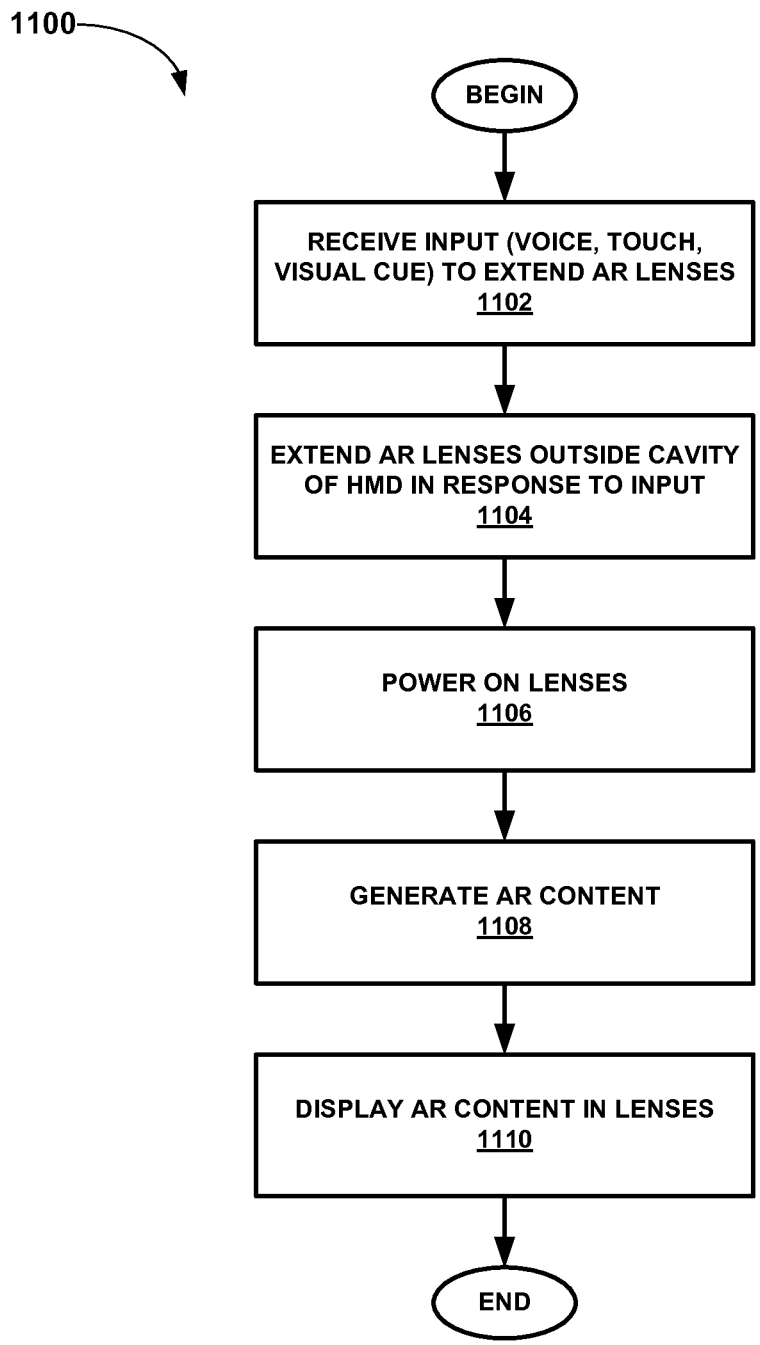
FIG. 11 is a flowchart illustrating another method for operating a retractable display of a head mounted device, according to an example embodiment.

FIG. 11 is a flowchart illustrating another method for operating the display 202, according to an example embodiment. At operation 1102, the HMD 101 receives an input related to a requested to extend the lenses. The input may be communicated via audio input, touch input, visual input). In one embodiment, operation 1102 may be implemented using the receiver module 302 of FIG. 3.

At operation 1104, the lenses may be lowered outside the HMD 101 in response to the input. In one embodiment, operation 1104 may be implemented using the actuation module 304 of FIG. 3.

At operation 1106, the lenses may be powered on. At operation 1108, the HMD 101 generates AR content. At operation 1110, the AR content is displayed in the display 204. In one embodiment, operations 1108, 1110 may be implemented using the AR content module 216 of FIG. 2.

Figure 12A:
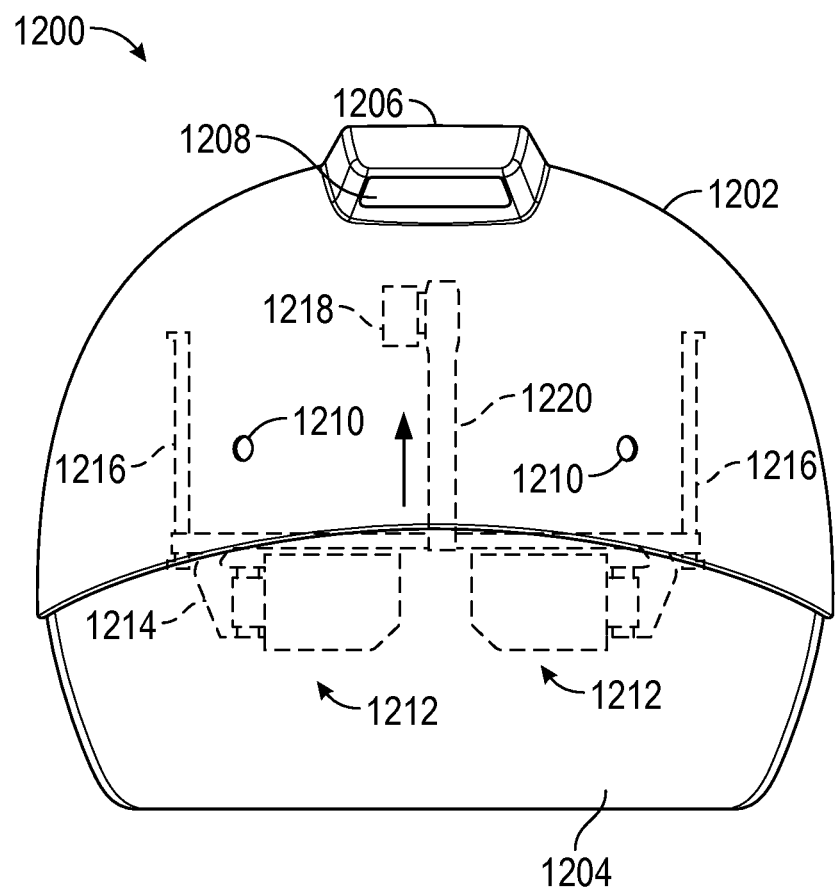
FIG. 12A is a diagram illustrating a front view of a retractable display in a lowered position, according to some example embodiments.
Figure 12B:
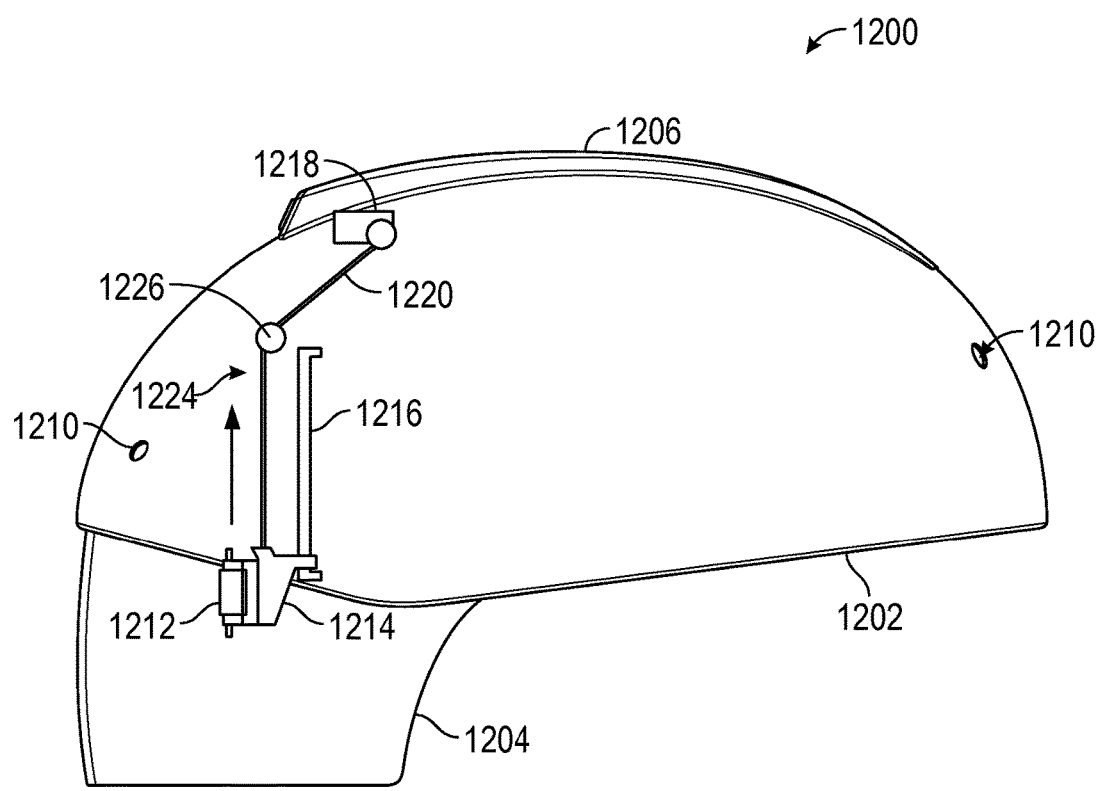
FIG. 12B is a diagram illustrating a cross-sectional side view of the retractable display of FIG. 12A.
Figure 12C:
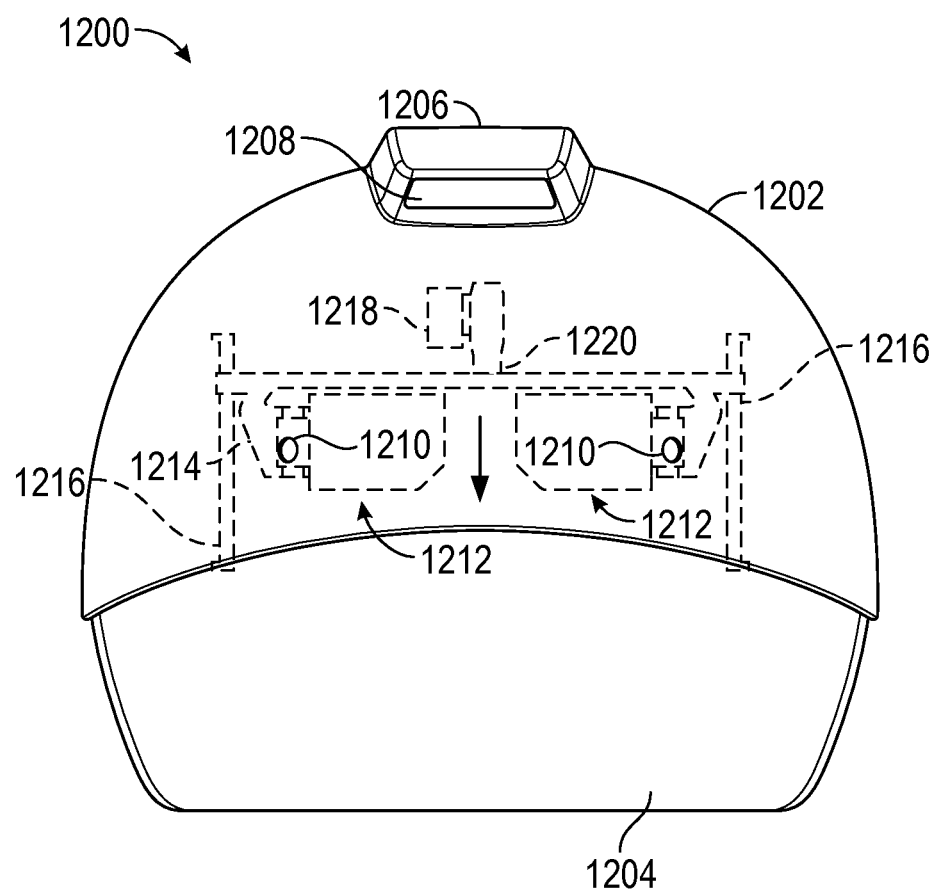
FIG. 12C is a diagram illustrating a front view of a retractable display in a raised position, according to some example embodiments.
Figure 12D:
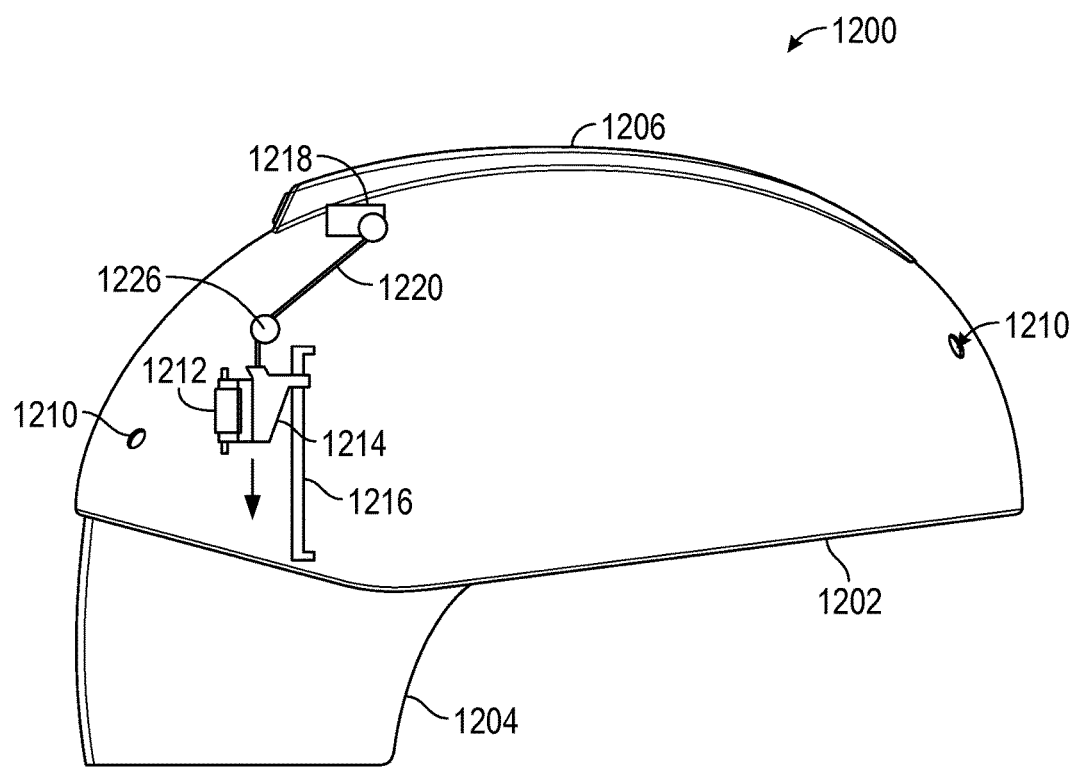
FIG. 12D is a diagram illustrating a cross-sectional side view of the retractable display of FIG. 12C.

FIGS. 12A and 12C are diagrams illustrating front views of retractable lenses of a HMD 1200 suitable for viewing AR content, according to some example embodiments. FIGS. 12B and 12D are diagrams illustrating cross-sectional side views of retractable lenses of the HMD 1200. The HMD 1200 includes a helmet 1202 connected to a visor 1204. The helmet 1202 may include sensors (e.g., optical or audio sensors) 1208 and 1210 disposed in the front, back, and a top section 1206 of the helmet 1202. Display lenses 1212 are mounted on a lens frame 1214. The display lenses include display 204 of FIG. 2. The lens frame 1214 can move up and down along an axis of the guides 1216 between a hidden position (e.g., raised position) within a cavity of the helmet 1202 and an exposed position (e.g., lowered position) outside the cavity of the helmet 1202. FIGS. 12A and 12B illustrate the lens frame 1214 in the exposed position. FIGS. 12C and 12D illustrate the lens frame 1214 in the hidden position.

The guides 1216 are mounted to the cavity of the helmet 1202 and extend out of the cavity of the helmet 1202. In one example, the guides 1216 extend up to an edge of the helmet 1202. A motor 1218 is disposed inside the cavity of the helmet 1202 and drives a belt 1220. The belt 1220 is connected to the lens frame 1214. The guides 1216, the motor 1218, and the belt 1220 may form the display mechanical system 220 of the FIG. 2. The lens frame 1214 moves up along an axis of the guides 1216 when the motor 1218 winds the belt 1220 to raise the lens frame 1214 inside the cavity of the helmet 1202 (as illustrated in FIGS. 12C and 12D). Similarly, the lens frame 1214 moves down along the axis of the guides 1216 when the motor 1218 unwinds the belt 1220 to lower the lens frame 1214 outside the cavity of the helmet 1202 (as illustrated in FIGS. 12A and 12B).

In another example embodiment, a belt guide 1226 may be disposed inside the cavity of the helmet 1202. The belt guide 1226 connects the belt 1220 between the motor 1218 and the lens frame 1214. A portion 1224 of the belt 1220 is parallel to the guides 1216.

Figure 13A:
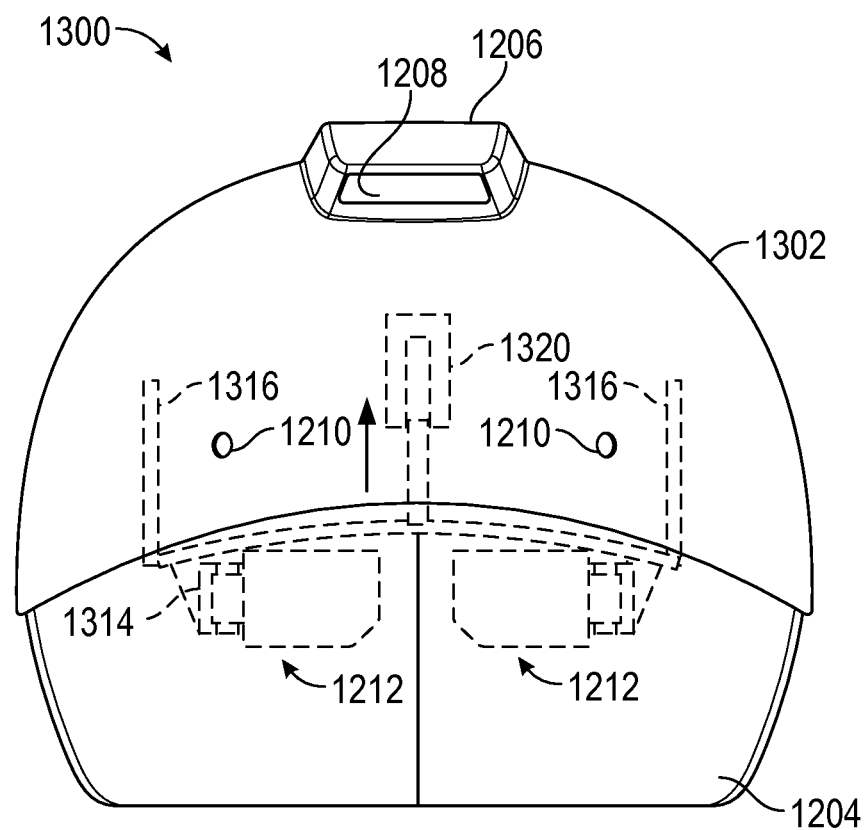
FIG. 13A is a diagram illustrating a front view of a retractable display in a lowered position, according to some example embodiments.
Figure 13B:
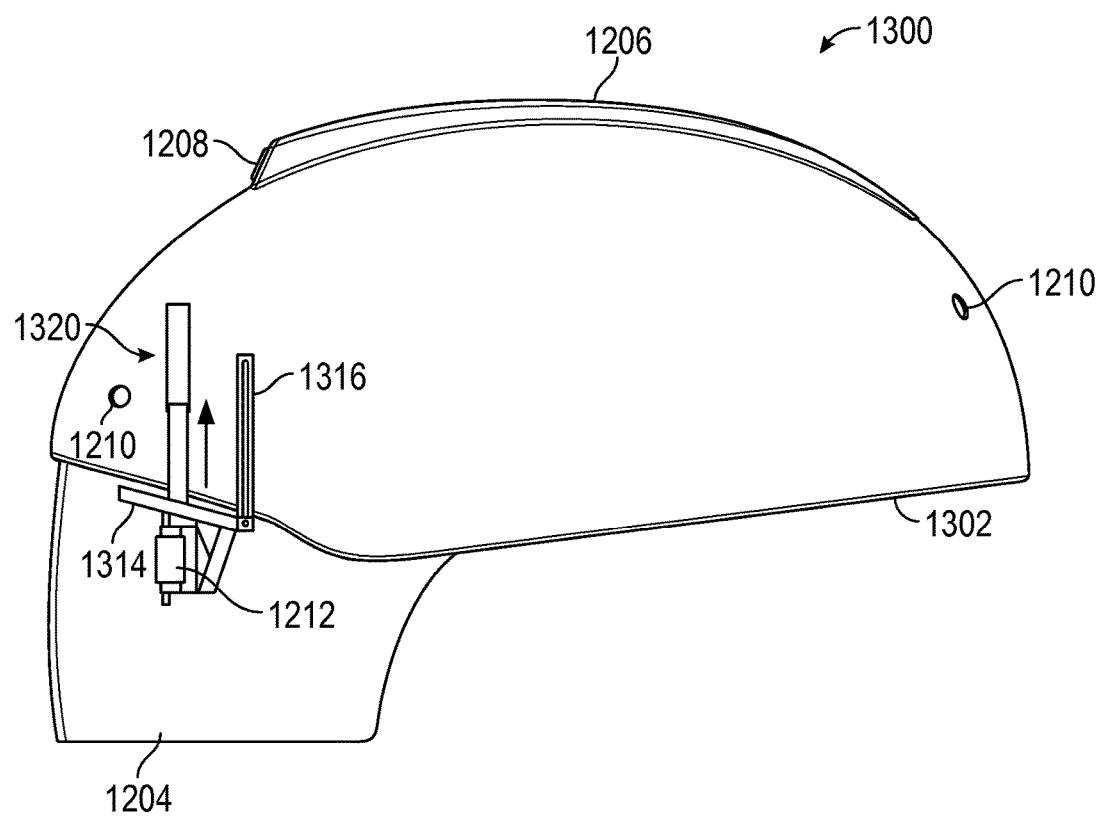
FIG. 13B is a diagram illustrating a cross-sectional side view of the retractable display of FIG. 13A.
Figure 13C:
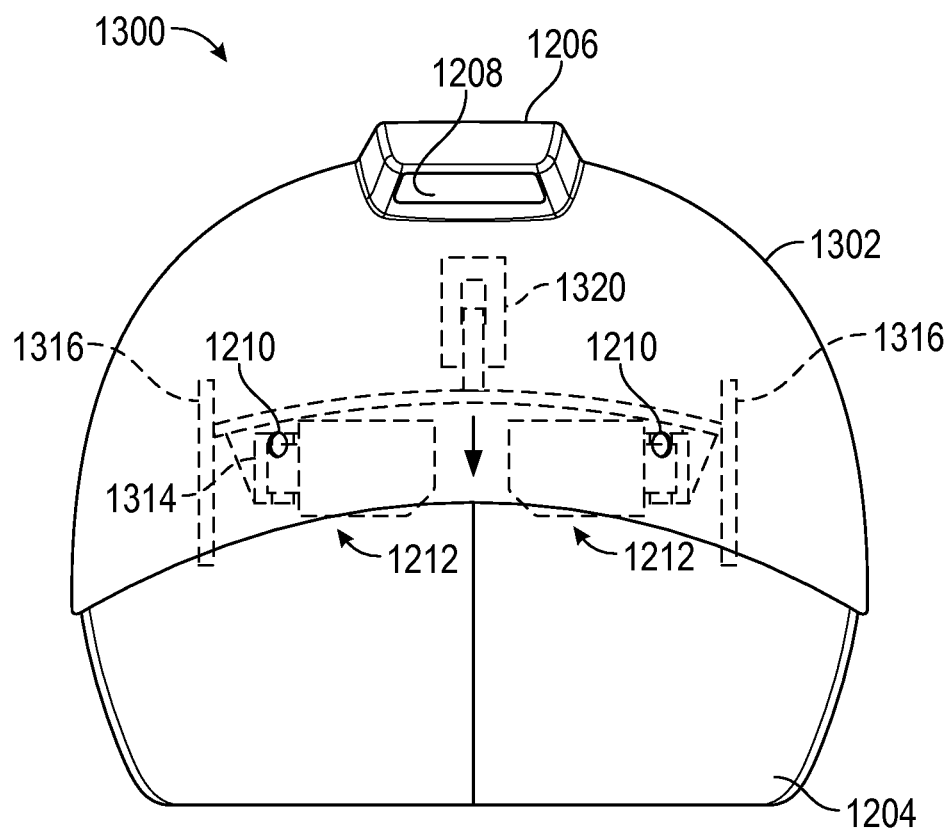
FIG. 13C is a diagram illustrating a front view of a retractable display in a raised position, according to some example embodiments.
Figure 13D:
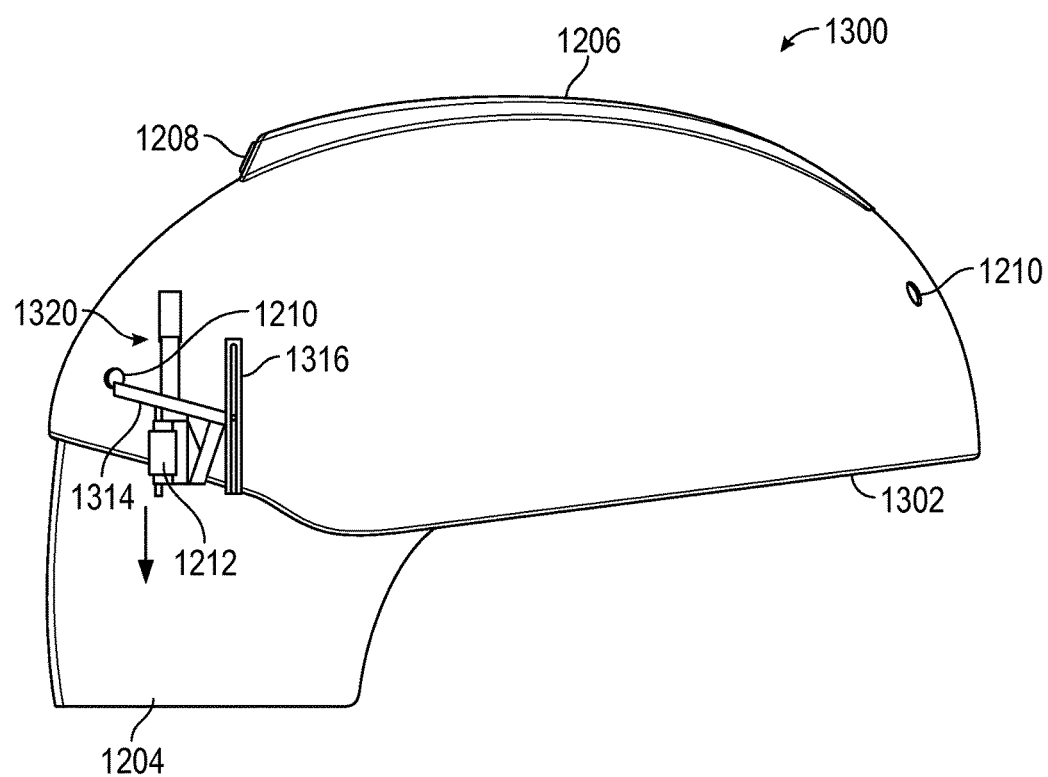
FIG. 13D is a diagram illustrating a cross-sectional side view of the retractable display of FIG. 13C.

FIGS. 13A and 13C are diagrams illustrating front views of retractable lenses of a HMD 1300 suitable for viewing AR content, according to some example embodiments. FIGS. 13B and 13D are diagrams illustrating cross-sectional side views of the retractable lenses of the HMD 1300.

The HMD 1300 includes a helmet 1302 connected to the visor 1204. The helmet 1302 may include sensors 1208 and 1210 disposed in the front, back, and the top section 1206 of the helmet 1302. Display lenses 1212 are mounted on a lens frame 1314. The lens frame 1314 can move up and down along guides 1316 (or tracks) from a hidden position (e.g., raised position) inside a cavity of the helmet 1302 to an exposed position (e.g., lowered position) outside the cavity of the helmet 1302. FIGS. 13A and 13B illustrate the lens frame 1314 in the exposed position. FIGS. 13C and 13D illustrate the lens frame 1314 in the hidden position.

The guides 1316 are mounted to the cavity of the helmet 1302 and extend out of the cavity of the helmet 1302. In one example, the guides 1316 extend up to an edge of the helmet 1302. An actuator 1320 is disposed inside the cavity of the helmet 1302. An end of the actuator 1320 is connected to the lens frame 1314. The actuator 1320, the guides 1316, and the lens frame 1314 may form the display mechanical system 220 of the FIG. 2. As such, the lens frame 1314 can be raised inside the cavity of the helmet 1302 (as illustrated in FIGS. 13C and 13D). The lens frame 1314 moves along an axis of the guides 1316 when the actuator 1320 retracts. Similarly, the lens frame 1314 can be lowered outside the cavity of the helmet 1302 (as illustrated in FIGS. 13A and 13B). The lens frame 1314 moves along the axis of the guides 1316 when the actuator 1320 expands.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 14:
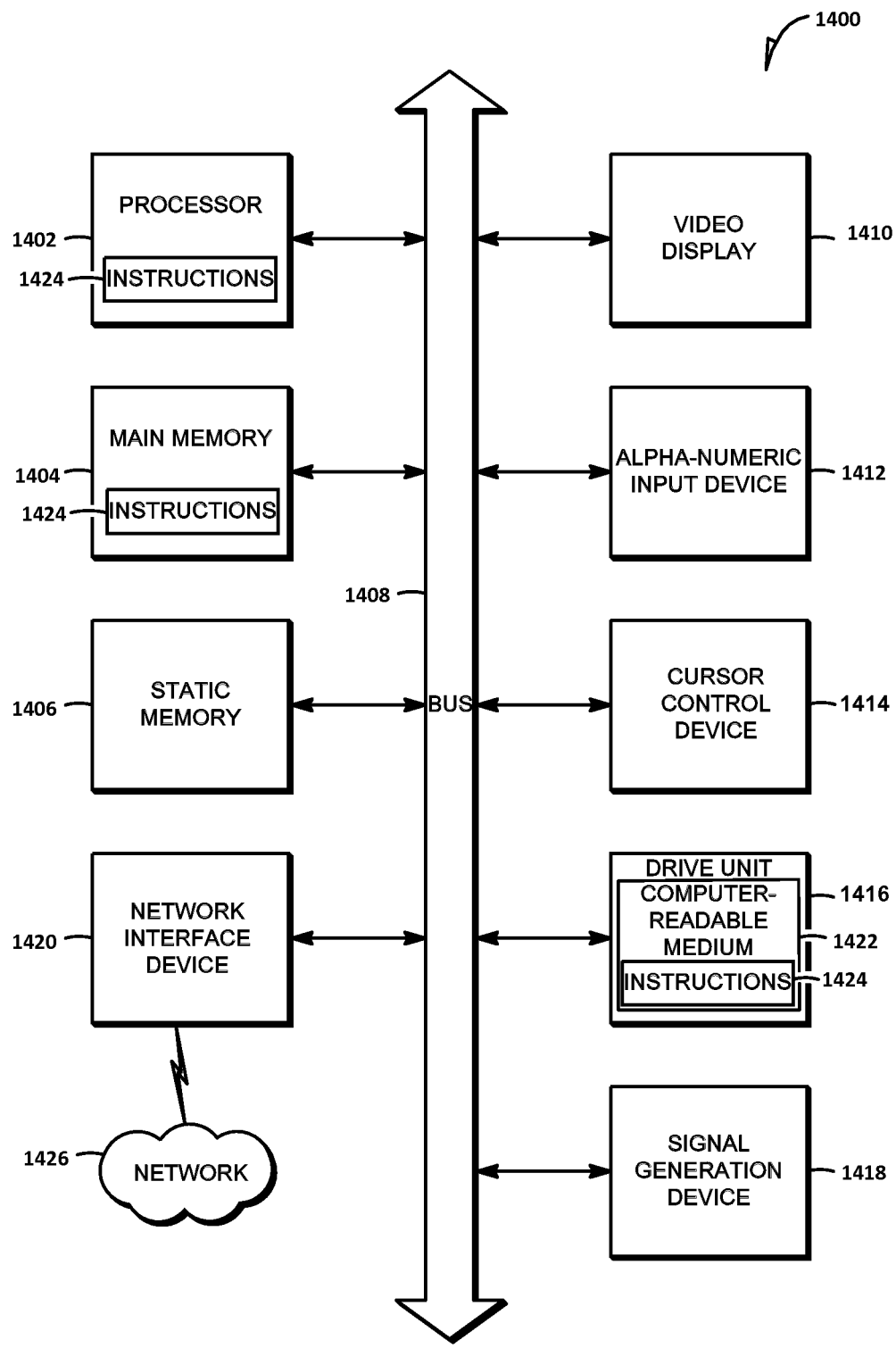
FIG. 14 is a block diagram illustrating components of a machine, according to some example embodiments, able to read instructions from a machine-readable medium and perform any one or more of the methodologies discussed herein.

FIG. 14 is a block diagram of a machine in the example form of a computer system 1400 within which instructions 1424 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 15:
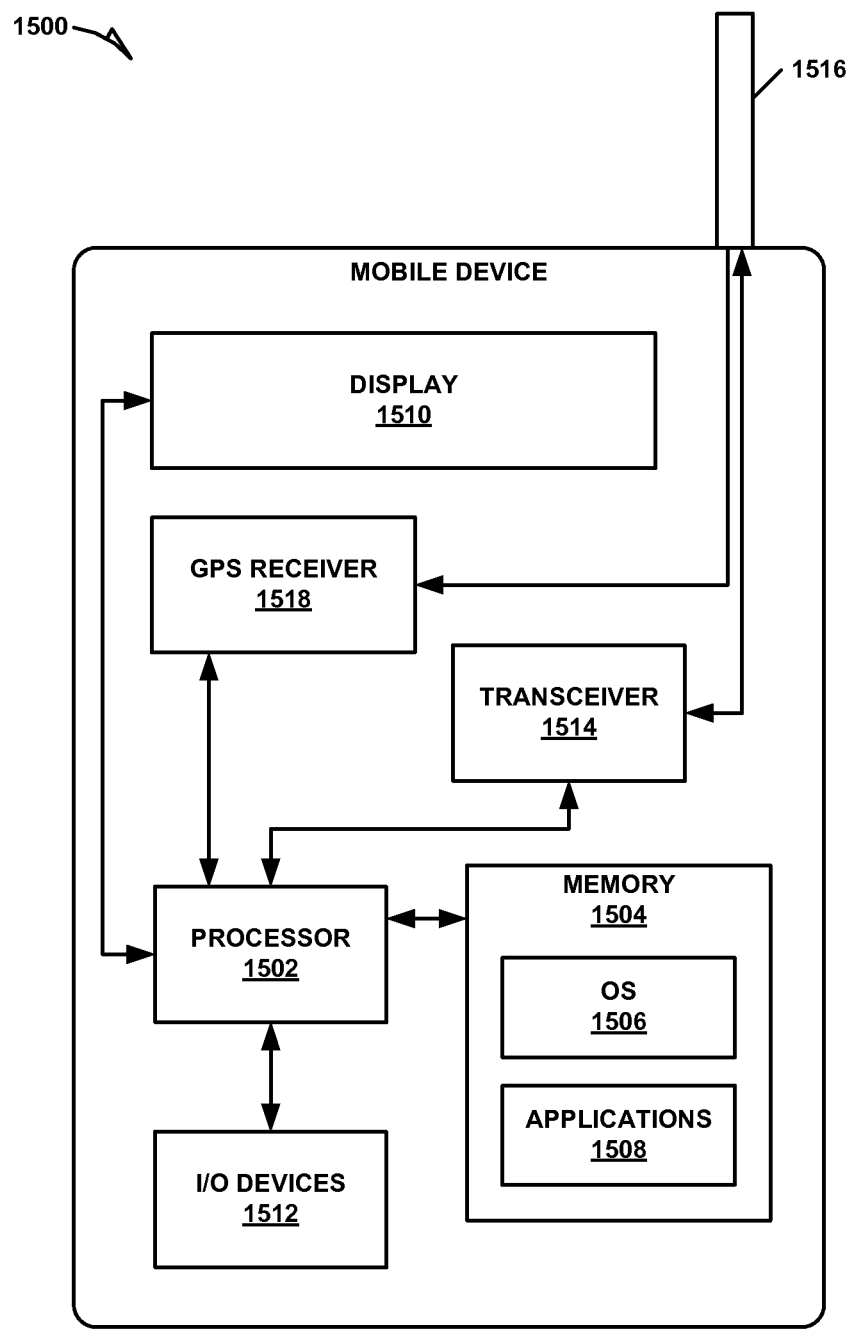
FIG. 15 is a block diagram illustrating a mobile device, according to an example embodiment.

FIG. 15 is a block diagram illustrating a mobile device 1500, according to an example embodiment. The mobile device 1500 may include a processor 1502. The processor 1502 may be any of a variety of different types of commercially available processors 1502 suitable for mobile devices 1500 (for example, an XScale architecture microprocessor, a microprocessor without interlocked pipeline stages (MIPS) architecture processor, or another type of processor 1502). A memory 1504, such as a random access memory (RAM), a flash memory, or other type of memory, is typically accessible to the processor 1502. The memory 1504 may be adapted to store an operating system (OS) 1506, as well as application programs 1508, such as a mobile location enabled application that may provide LBSs to a user. The processor 1502 may be coupled, either directly or via appropriate intermediary hardware, to a display 1510 and to one or more input/output (I/O) devices 1512, such as a keypad, a touch panel sensor, a microphone, and the like. Similarly, in some embodiments, the processor 1502 may be coupled to a transceiver 1514 that interfaces with an antenna 1516. The transceiver 1514 may be configured to both transmit and receive cellular network signals, wireless data signals, or other types of signals via the antenna 1516, depending on the nature of the mobile device 1500. Further, in some configurations, a GPS receiver 1518 may also make use of the antenna 1516 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A head mounted device comprising:
an enclosure having a cavity;
a visor coupled to the enclosure;
a guide extending from the enclosure;
a lens frame coupled to the guide, the lens frame configured to move along an axis of the guide between a first position within the cavity of the enclosure and a second position outside the cavity of the enclosure;
a first and a second display lens mounted to the frame, the first and second display lens being distinct from the visor;
an optical sensor configured to detect real-world objects in a physical environment;
a receiver module configured to determine that a real-world object detected by the optical sensor is associated with an Augmented Reality (AR) content and, in response to determining that the real-world object detected by the optical sensor is associated with the AR content, cause the lens frame to extend from the first position to the second position; and
an augmented reality module, implemented by a hardware processor, configured to cause display of the AR content on at least the first display lens in response to the lens frame being extended from the first position to the second position.

2. The head mounted device of claim 1, wherein the enclosure comprises a helmet, wherein the guide extends away from a cavity of the helmet, wherein the at least one display lens is transparent and configured to display augmented reality content.

3. The head mounted device of claim 1, further comprising:
a motor disposed within the enclosure; and
a belt connecting the motor to the lens frame, wherein the motor is configured to wind a portion of the belt to move the lens frame to the first position of the lens frame, and to unwind the portion of the belt to move the lens frame to the second position of the lens frame.

4. The head mounted device of claim 3, further comprising:
a belt guide disposed adjacent to the motor in the cavity of the enclosure, wherein the belt guide routes the belt from the motor to the lens frame, a portion of the belt between the belt guide and the lens frame being parallel to the axis of the guide.

5. The head mounted device of claim 1, further comprising:
an actuator disposed within the enclosure, wherein the actuator is configured to extend and contract along the axis of the guide between the first position of the lens frame and the second position of the lens frame.

6. The head mounted device of claim 1, further comprising:
a sensor configured to detect a first condition and a second condition,
the controller further configured to initiate an extension of the lens frame from the first position to the second position in response to the sensor detecting the first condition, and to initiate a retraction of the lens frame from the second position to the first position in response to the sensor detecting the second condition.

7. The head mounted device of claim 6,
wherein the augmented reality module is further configured to cause at least the first display lens to display augmented reality content in response to the first condition, and to cause at least the first display lens to hide the augmented reality content in response to the second condition.

8. The head mounted device of claim 6,
wherein the augmented reality module is configured to cause at least the first display lens to display augmented reality content in response to the lens frame being in the second position, and to cause at least the first display lens to hide the augmented reality content in response to the lens frame being in the first position.

9. The head mounted device of claim 6, wherein the sensor comprises an audio sensor or an optical sensor.

10. The head mounted device of claim 6, further comprising:
a wireless module configured to wirelessly communicate with a wearable device external to the head mounted device, the wireless module configured to receive a first message and a second message from the wearable device, wherein the controller is configured to correlate the first message with the first condition and the second message with the second condition.

11. The head mounted device of claim 10, wherein the first message corresponds to a first state of the wearable device, the second message corresponds to a second state of the wearable device.

12. The head mounted device of claim 11, wherein the first state of the wearable device corresponds to a first relative position between the wearable device and the head mounted device, wherein the second state of the wearable device corresponds to a second relative position between the wearable device and the head mounted device.

13. The head mounted device of claim 6, wherein the controller is configured to power on at least the first display lens in response to the first condition, and to power off at least the first display lens in response to the second condition.

14. The head mounted device of claim 6, wherein the controller is configured to power on at least the first display lens in response to the lens frame being in the first position, and to power off at least the first display lens in response to the lens frame being in the second position.

* * * * *